ated July 26, 1966

3,262,893
ION EXCHANGE RESINS FROM KERATIN AND A VINYL CARBOXYLIC COMPOUND
John J. Krajewski, Wheeling, and Harry T. Anderson, Clarendon Hills, Ill., assignors to Swift & Company, Chicago, Ill., a corporation of Illinois
No Drawing. Filed Oct. 4, 1962, Ser. No. 228,230
6 Claims. (Cl. 260—2.2)

This invention relates to a novel composition of matter and to processes for the production of said composition of matter in various forms. The present discovery also relates to the treatment of solutions and the separation of metal or hydrogen ions therefrom. More particularly, the invention relates to the modification of a water insoluble proteinaceous material of great molecular weight with a polymerizable acidic substance so as to impart a multiplicity of acidic functional groups thereto. Also contemplated within the scope of this invention is the use of this modified proteinaceous material as an ion exchange resin.

Commercially available ion exchange resins are currently enjoying widespread use in areas of water treatment to produce soft water and, also, for the recovery of certain valuable metal ions from dilute solutions. Usually, these ion exchange resins are derived in two fundamental manners. One pathway is by chemically treating cross-linked or netted-type copolymers to introduce a large number of acidic or basic functional groups. The copolymerization is normally carried out in suspension whereby a product with a predetermined particle size range can be obtained. However, the size of the particles depends upon the degree of mechanical agitation, the viscosity of the solution, the nature of the suspension stabilizer and associated factors. Furthermore, the chemical introduction of the functional groups is quite often difficult to control. An alternative route to the production of ion exchange resins involves the copolymerization of monomers, which already contain the desired functional groups, with suitable cross-linking agents. Although these products may have a capacity independent of particle size and consistent with that calculated from the composition of the monomer mixture, the importance of reproducibility of a given particle size remains an associated problem in either case. As can be seen from the above, commercially available ion exchange resins are not only difficult to produce but are also quite expensive.

Certain ion exchange capacities have been observed for proteinaceous substances in various systems but such substances have not enjoyed substantial commercialization because of poor capacity, low flow rate, and susceptibility to bacterial contamination and degradation. It is therefore apparent that an ion exchange resin which could be produced from inexpensive sources and yet not possess the aforementioned disadvantages would be most desirable.

It is, therefore, an object of this invention to produce high capacity ion-exchange resins from relatively inexpensive sources.

A further object is to produce high capacity ion exchange resins while maintaining superior flow characteristics.

Another object of this invention is to provide a process for producing ion exchange resins which uses a naturally-occurring preformed resin which does not require dispersion control during the polymerization process nor need to undergo complex chemical modification to introduce active ion exchange sites.

Still another object is to provide an ion exchange resin which produces facile and rapidly occurring reactions.

A still further object of this invention is to provide ion exchange resins which may be regenerated with high efficiency.

Additional objects include the production of an ion exchange resin suitable for the production of soft water for industrial uses.

Additional objects, if not specifically set forth herein, will be readily apparent to those skilled in the art from the detailed description of the invention which follows.

In general, this invention is concerned with the modification of colloidal materials having molecular weights in excess of 10,000 by permeation of their physical structure with a monomeric acidic material followed by polymerization of the acidic material so as to lock it into place. The high molecular weight colloidal materials utilized are insoluble proteins or soluble proteinaceous material which may be insolubilized by cooking and/or chemically by reaction with chromic acid or aldehydes such as formaldehyde, glyoxal, glutaraldehyde, etc. The proteinaceous material is saturated with a polymerizable monomeric acidic substance and then treated with a polymerization catalyst whereby both protein and resin molecules are interlocked in such a way as to prevent any extraction of the polymerized acidic substance by aqueous systems. In the instant case, it has been found that the modified proteinaceous materials possess high capacity, excellent flow rates and are not readily susceptible to bacterial contamination. Furthermore, the use of the proteinaceous materials enables one to produce very effective ion exchange resins from relatively inexpensive sources.

More specifically, the ion exchange resins of this invention are prepared from a host of common naturally occurring polymeric materials. Proteinaceous substances which can be made readily available in particulate forms such as granules, beads or the like are the most preferred. Water soluble proteins such as albumens (egg and blood) can be cooked to insolubilize them. Also, the soluble proteins can be fixed chemically by reaction with chromic acid or aldehydes. For example, glue, gelatin, casein, soy, zein and numerous other protein materials may be made insoluble by treatment with formaldehyde, glyoxal, glutaraldehyde, etc. Fibrous proteins such as silk, wool, hair and feathers are particularly suitable because of their tremendous surface area. The most desirable proteinaceous material, however, is the kertainaceous ground hooves and born meal. The particle size will usually range between 14:200 mesh with 16–50 mesh being preferred. This latter material when modified has exceptionally high capacity and physical granularity which enables it to be readily adaptable to commercial use.

The proteinaceous materials utilized in this invention, even though insoluble in water, will readily absorb and desorb moisture rapidly. Whether the protein is naturally insoluble or insolubilized by heat and/or chemically, it will hydrate readily picking up an equal weight or more of water. The proteinaceous material will also soak up substantial quantities of polymerizable acidic monomers or solutions thereof. Upon being absorbed, the acidic monomers is polymerized to produce a polymeric material having a greatly increased number of acidic functional groups.

The polymerizable monomeric acidic substances utilized in this invention are hydrophilic and characterized as possessing a polymerizable ethylenic group. Included are the hydrophilic acrylic and alkyl acrylic acids as well as other hydrophilic vinyl type monomeric polybasic acids, anhydrides or acid halides of up to about 20 carbon atoms. Specific acidic substances are acrylic, methacrylic, crotonic, maleic, fumaric, sorbic, itaconic and aconitic acids as well as their anhydrides and acyl halides. Also contemplated are the numerous variations of acidic monomers other than the polymerizable carboxylic acids. For example, the successful applications of sulfonic and phosphoric acid groups to polymeric substances for their use as ion exchange materials are well known by those skilled in the art and may be used in the practice of this invention. While some of the ethylenic acids having up to about 20 carbons do not readily polymerize alone by means of a peroxide catalyst, they do readily copolymerize with other monomeric materials that are easily polymerized, i.e., styrene, acrylic or methacrylic acids. Further variations include the use of cross-linking agents such as divinyl benzene, etc.

It is desirable to employ acidic monomers which are compatible with the protein in order for the polymer to form within and not only on the surface of the protein structure. Satisfactory ion exchange resins have been prepared in which the acidic monomer used amounted up to about 65% or more of the total weight of the naturally occurring polymers. However, the quantity of a given monomer used is variable over a wide range and dependent on the desired capacity of the ion exchange product, a cost versus capacity factor, solubility of the monomer, etc. Usually 20–40% monomer based on the weight of the protein is preferred. While the invention is not to be restricted to specific acidic monomers, those of lower molecular weight are preferred. This is so, since the lower molecular weight monomers permit the incorporation of the greatest number of active functional groups with a minimum quantity of any given monomer.

The proteinaceous substance is usually hydrated with water and the excess water removed by draining, filtering, squeezing, etc. Acidic monomer and catalyst is then added so as to saturate the natural polymer with the monomer. The mixture is usually agitated for a period of time so that the monomer is sufficiently absorbed. This usually occurs within 15 minutes, however, more or less time should be employed depending upon the specific protein and monomer utilized. The resulting mixture is then heated until polymerization of the entire mass is complete. While the polymerization time may vary, depending upon the reactants, proportion, temperature, etc., 1½ hours is usually sufficient for complete polymerization of those monomers of most interest.

The catalyst may be absorbed by the natural polymer prior to the absorption of the acidic monomer so as to be present throughout the structure. In the same way, it may be soaked in after absorption of the monomer. In fact there are many alternative ways of producing the ion exchange resin having high capacity and great utility, the only limitation being complete saturation and dispersion of the acidic monomer so that the polymerization results in a chemical and mechanical locking in of the polymerized substance so that there is no subsequent extraction of the polymerized monomer by the aqueous or regenerating systems.

In certain instances it has been found that oxidation of the ion exchange resin with an oxidizing agent such as the peroxides, chromates, perchlorates, permanganates, etc., will render it regeneratable with a brine solution. This advantage is not a property of carboxylic acid-type resins and may be attributed directly to the operation of the protein as a strong chelating agent. The exact structure of the modified protein is not known with certainty but it appears that oxidation produces some type of chelating bonds with the metal ions in conjunction with the free carboxyl groups. It is believed that this structure permits regeneration with a brine solution in some cases.

After the oxidation treatment, the product can be treated with hypochlorite ion, a dilute (1–5%) formaldehyde solution or other protein tanning agents in order to stabilize the products from bacterial decay. The product can then be washed, dried and stored for use.

In certain instances it has been found that operation at low temperature permits the mechanical mixing of the natural polymer, water, acidic monomer and catalyst all at one time. Since the polymerization has an induction period it is frequently possible to obtain complete uniformity prior to conclusion of the exothermic polymerization reaction all within a relatively short period of time. Subsequent use of a peroxide is desirable when a bleaching effect is needed. This oxidation step may be conducted at the pH of the resin system, if done at elevated temperatures resulting from the exothermicity of the polymerization reaction. Accordingly, the polymerization and oxidation steps may be conveniently combined by simply heating the monomer-protein mixture to around 40–100° C. and then blending in the prescribed amount of dilute hydrogen peroxide. However, initial reaction temperatures between 50° C. and 60° C. are preferred.

The polymerization and/or oxidation is carried out by the use of the well-known initiators. The free radical initiators include, for example, the organic peracids such as peracetic, performic, lauroyl peroxide, stearoyl peroxide, and other. Similarly, the inorganic peracids or salts will also perform the desired effect. Among such reagents are, for example, persulfuric, pernitric, and their ammonium, sodium or other metal salts. Also included are barium peroxide, sodium peroxide, the perborates, persulfates, perchlorates, permanganates, and sodium hypochlorite. Aromatic peroxides such as benzoyl peroxide, tert-butyl perbenzoate, as well as the thermally unstable azo compounds such as azobisdiisobutyronitrile are included.

A standard tube of 1 and ¼ inch inside diameter and 48 inches in length, with a 24-inch bed of material was employed in evaluating the ion exchange material produced by this invention. Both the treatment of water and the regeneration step were set up in a down-flow manner. The hydrogen forms of the resin were prepared by leaching with 5% hydrochloric acid followed by rising with distilled water until a chloride-free effluent was obtained. Exchange capacities were determined from columns regenerated in this manner inasmuch as the regeneration utilizing brine is inefficient due to the sequestering ability for the alkaline earth cations in preference to the sodium ions at the carboxyl sites.

Feed water hardness, as well as discharge water hardness, was determined by the use of Dearborn Chemical water testing reagents. Total hardness evaluation consisted in treatment of the water with an indicator in a buffer followed by titration with ethylenediamine tetraacetic acid (EDTA). The Dearborn Chemical method for calcium which consisted of a similar system was also utilized. The results obtained with these reagents were cross-checked against other official methods listed in U.S. Public Health Methods, as well as by spectrographic analysis. 2–7 gallons/minute/cubic foot of ion exchange material was the operating, and 2–3 gallons/minute/cubic foot the regenerating, flow rate. All operations were conducted with tap water having a hardness of 7.9–8.1 grains.

The following examples are presented to illustrate the invention. It will be understood that these examples are illustrative and are not to be taken in any manner as limiting the invention as defined in the appended claims.

*Example 1*

To 100 g. of dry 20–28 mesh hoof meal was added a mixture of 172 g. glacial methacrylic acid, 20 cc. of water and 1 cc. of 35% hydrogen peroxide. The above mixture was agitated for 15 minutes at which time the monomer had been sufficiently absorbed. The resulting mixture was next heated on a steam bath for one hour, after which the polymeriaztion was complete. To this mixture was then added 500 cc. of distilled water containing 42 cc. of 35% hydrogen peroxide and the pH adjusted to 9 with NaOH. After one hour the product was washed with distilled water. Treatment with formaldehyde or other protein tanning agents stabilized the product towards bacteriological susceptibility. Upon evaluation, the resin was found to have a capacity of 13 kilograins of hardness per cubic foot. Water of high polish with no odor is obtained, even if the resin remains in a static condition for a prolonged time.

*Example II*

To 100 gms. of dry 20-28 mesh hoof meal was added a mixture of 20 gms. of glacial methacrylic acid and 5 cc. of water. The wet solid was mixed for 15 minutes, then heated on a steam bath to 50° C. The hot material was removed from the steam bath and 20 cc. of water containing 2.5 cc. of 50% hydrogen peroxide was rapidly and thoroughly blended in. At this point, the reaction became very exothermic with the temperature rising to 100° C. in 3-5 minutes. After the contents had cooled to room temperature, the product was washed with water to yield an ion exchange resin having a capacity in excess of 15 kilograins exchange as $CaCO_3$ per cubic foot. The product was insoluble even in water having a temperature of 175° F.

*Example III*

Three hundred grams of dry 20-28 mesh hoof meal was soaked, then washed with distilled water. After removal of excess water, the hoof meal was mixed for 15 minutes with 120 g. of glacial acrylic acid containing 1 cc. of 35% hydrogen peroxide. After this time the mixture was heated on a steam bath, with stirring, for 1½ hours. Then, 42 cc. of 35% hydrogen peroxide in 150 cc. of water was added to the mixture with vigorous stirring. After the product had cooled, it was washed with distilled water and, upon evaluation, found to have a capacity in excess of 40 kilograins of hardness per cubic foot.

*Example IV*

Below are tabulated increasing capacities of resins produced, according to the method outlined in Example II, as a result of variation in type and weight of monomer per given 100 g. of hoof meal.

| Methacrylic acid, gms.: | Capacity (kgr./ft.$^3$) |
| --- | --- |
| 10 | 11+ |
| 20 | 15+ |
| 40 | 30+ |
| Acrylic acid, gms.: | |
| 10 | 13+ |
| 20 | 28+ |
| 40 | 40+ |

*Example V*

Defatted soybean grits were screened to a uniform size of 20-28 mesh. 1000 gms. of the screened grits was moistened with 800 cc. of water containing 20 cc. of formaldehyde. This mixture was warmed to 60° C. with agitation in a rotary drier to insolubilize the meal. When formaldehyde vapors were no longer apparent there was added a mixture of 500 gms. of acrylic acid containing 40 cc. of 50% hydrogen peroxide all during agitation at 60° C. After a few minutes exothermic polymerization took place and the dryer discharged an almost granular mixture which after washing gave an ion exchange material with a capacity consistent with that calculated.

In the explanation of the possible mechanisms involved, it is found that it is nearly impossible to propose a process theory that is not subject to criticism. Therefore, no effort is made to exactly define the chemical reactions that may be taking place. Polyacrylic acid as prepared from the monomer in the presence of a peroxide catalyst, notwithstanding its high molecular weight and high viscosity in aqueous solution, is very soluble in water when not cross-linked. Yet, it has been found that no polyacrylic acid is leached from the ion exchange resins produced by this invention as evidenced by continued use and regeneration without loss of ion exchange capacity. It, therefore, appears that the relatively small molecules of monomeric acids are able to penetrate throughout the much larger and spacious colloidal molecules characteristic of the natural polymer structure and, after diffusion throughout and polymerization, they are interlocked chemically and mechanically within and throughout the colloidal molecule or micelle.

Crossing linking agents may also be used particularly in those instances where very minute leaching might occur. Such cross-linking agents are well-known in the art and include the polyfunctional unsaturates having two or more polymerization sites. Examples include, divinyl benzene, allyl acrylate, vinyl methacrylate, diallyl phthal,-ate, acrylic esters of glycols and vinyl ethers of glycols. Uusually, the amount of cross-linking agent will vary from 1-20% by weight based upon the acidic monomer used. The preferred range of the more expensive coupling agents is between 2-10%.

If additional safety towards bacterial decay is desired, the ion exchange resins can be treated with hypochlorite ion, a dilute (1-5%) formaldehyde solution or other protein tanning agents in order to stabilize the product. This treatment produces a firmer product and checks any tendency of the protein to solubilize.

It will become increasingly apparent to those skilled in the art that the ion exchange compositions of this invention can be prepared in a host of forms and combinations so as to permit their utilization under a wide variety of conditions. Combinations of proteinaceous substances with fibrous cellulosics can be used to form webs, woven or non-woven fabrics or felts. In the fibrous form such as felts, comprising either animal or animal and vegetable fibers in combination, they may be used in high speed water treatment units where constant regeneration can be effected on a continuous basis. The acid regenerated resins when in a finally divided powdered form are excellent catalysts for the setting of urea or phenolic resins in the bonding of plywood. In granular porous forms, such as are obtained from hoof and horn meal, soy grits and blood meal, they are particularly useful for industrial water treatment, whether in the free acid or alkali metal salt form, where high capacity and low cost are of first importance.

Depending upon whether the ion exchange capacity is due to carboxyl, sulfonic, phosphonic or other acidic radicals, regeneration methods may be varied to suit the conditions employed. In some instances, wherein the softening ability of the carboxyl group is most efficient, regeneration utilizing a brine solution is not efficient due to the strong affinity of the carboxyl groups for calcium and other dibasic cations. In the hydrogen cycle, the weakly acidic character of the functional groups may restrict the influents to alkaline solutions. Therefore, one of the important fields of utility for the ion exchange material lies in the area of treatment of industrial water. Such industrial applications include treating boiler water or producing soft water for the polymerization industry. Recovery of trace metal ions from dilute solutions, as in ore recovery is another facet of this invention. Furthermore, the ion exchange material of this invention can be used in conjunction with other exchanges for deionization purposes. Additional utility comprises use in the beverage industry to remove calcium bicarbonate from water without the formation of mineral acids from the sulfate and chloride salts.

Obviously, many modifications and variations of the invention as hereinbefore set forth may be made without departing from the spirit and scope thereof and, therefore, only such limitations should be imposed as are indicated in the appended claims.

We claim:

1. A method for preparing an ion exchange resin which comprises reacting a keratinaceous substance with a vinyl, carboxylic monomer solution in the presence of a polymerization catalyst, and thereafter treating the product with an oxidizing agent and a bacteria decay preventative.

2. A method for preparing an ion-exchange resin which is regeneratable with a brine solution comprising forming a mixture by saturating an insoluble proteinaceous substance with a vinyl, carboxylic monomer, heating said mixture in the presence of a polymerization catalyst until polymerization is substantially complete, adjusting the pH of the mixture to the alkaline side and treating the mixture with an oxidizing agent whereby a resin capable of being regeneratable with brine is produced.

3. A method for preparing an ion-exchange resin which is regeneratable with a brine solution comprising forming a mixture by saturating an insoluble proteinaceous substance with a vinyl, carboxylic monomer having up to about 20 carbon atoms, heating said mixture in the presence of a polymerization catalyst until polymerization is substantially complete, adjusting the pH of the mixture to at least about 9 and treating the mixture with an oxidizing agent whereby a resin capable of being regeneratable with brine is produced.

4. The mehod of claim 3 wherein the insoluble proteinaceous substance is keratin.

5. The method of claim 3 wherein the vinyl, carboxylic monomer is selected from the group consisting of acrylic acid, methacrylic acid, maleic acid and their anhydrides.

6. A method for preparing an ion-exchange resin which is regeneratable with a brine solution comprising hydrating an insoluble proteinaceous substance, forming a mixture by saturating said substance with a vinyl, carboxylic monomer, agitating the mixture to insure that said monomer is sufficiently absorbed by said substance, heating said mixture to a temperature of between about 40° C. and 100° C. in the presence of a free radical initiator until polymerization is substantially complete, adjusting the pH of the mixture to at least about 9 and treating the mixture with an oxidizing agent whereby a resin capable of being regeneratable with brine is produced.

References Cited by the Examiner

UNITED STATES PATENTS 2,667,475  1/1954  Fick _____ 260—123.7
3,041,292  6/1962  Hatch _____ 260—2.1

OTHER REFERENCES

Calmon, Ion Exchangers in Organic and Biochemistry, page 13, Interscience (1957).

Speakman, Fibrous Protein, pp. 169–182, pp. 171 and 177–181 relied upon. Academic Press, Inc., 1955.

WILLIAM H. SHORT, *Primary Examiner.*

J. C. MARTIN, *Assistant Examiner.*